(12) United States Patent
Takahashi et al.

(10) Patent No.: US 7,549,495 B2
(45) Date of Patent: Jun. 23, 2009

(54) MOTORCYCLE

(75) Inventors: Haruhito Takahashi, Shizuoka (JP);
Katsumi Mori, Shizuoka (JP);
Kazuhiro Suzuki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 314 days.

(21) Appl. No.: 11/696,076

(22) Filed: Apr. 3, 2007

(65) Prior Publication Data

US 2007/0232138 A1    Oct. 4, 2007

(30) Foreign Application Priority Data

Apr. 3, 2006    (JP)    ............... 2006-102416

(51) Int. Cl.
*B62K 11/00*    (2006.01)
(52) U.S. Cl. ........................................ 180/219; 439/34
(58) Field of Classification Search ................ 180/219;
439/34; 74/523–525, 543–548, 557, 501.6,
74/502, 488, 489
See application file for complete search history.

(56) References Cited

U.S. PATENT DOCUMENTS

| | | | |
|---|---|---|---|
| 6,199,445 B1 * | 3/2001 | Valdez | 74/501.6 |
| 6,499,236 B2 * | 12/2002 | Yoshida et al. | 37/219 |
| 6,983,949 B2 * | 1/2006 | Ueno et al. | 280/279 |
| 7,040,448 B2 * | 5/2006 | Good | 180/334 |
| 7,121,386 B1 * | 10/2006 | Eineke | 188/24.16 |
| 7,168,543 B2 * | 1/2007 | Oishi et al. | 192/99 S |
| 2007/0284172 A1 * | 12/2007 | Satake et al. | 180/219 |
| 2008/0011534 A1 * | 1/2008 | Miyashiro | 180/219 |
| 2008/0078601 A1 * | 4/2008 | Miki et al. | 180/219 |
| 2008/0169148 A1 * | 7/2008 | Beiber Hoeve et al. | 180/219 |

FOREIGN PATENT DOCUMENTS

JP    2000-062675    2/2000

* cited by examiner

*Primary Examiner*—Paul N Dickson
*Assistant Examiner*—Tashiana Adams
(74) *Attorney, Agent, or Firm*—Hogan & Hartson LLP

(57) ABSTRACT

A motorcycle that inhibits free movement of a coupler along with turning of a handle includes a leg shield that covers a head pipe. Cable groups including a brake cable and a lead wire that extend from a handle are arranged inside the leg shield. A first cable group that includes at the least the brake cable is disposed to a front side of the head pipe inside the leg shield. A second cable group includes a coupler that connects the lead wire. The coupler of the second cable group is disposed to the rear side of the head pipe inside the leg shield.

13 Claims, 6 Drawing Sheets

MOTORCYCLE

RELATED APPLICATIONS

This application claims the benefit of priority under 35 USC 119 of Japanese patent application no. 2006-102416, filed on Apr. 3, 2006, which application is hereby incorporated by reference in its entirety.

BACKGROUND OF THE INVENTION

1. Field of the Invention

The present invention relates to a motorcycle, and more particularly to a tandem scooter in which a plurality of cable groups are disposed inside a leg shield.

2. Description of Related Art

Cables such as brake cables and lead wires that are connected to various types of switches are attached to a motorcycle. These cables extend downward from a handle. In many cases, the cables are fixed to a frame pipe of a vehicle body frame. The cables are fixed to the frame pipe in order to avoid becoming tangled or damaged as a result of free movement that takes place when the handle is turned.

Methods for fixing the cables have been proposed (for example, in JP-A-2000-62675), such as a fixing method in which a circular arc shaped cable guide is attached to the frame pipe, and the cables are held inside the cable guide, and a fixing method in which a groove with a U-shaped cross section is formed in the vicinity of the frame pipe, the cables are held inside the groove, and the frame pipe is used to close the opening of the groove.

As described above, if the cables are fixed to the frame pipe, it is possible to inhibit the cables from moving freely when the handle is turned. However, when a group of couplers that connects the cables is positioned in the middle of the cables, the group of couplers is not secured by the frame pipe. As a result, the group of couplers moves freely along with turning of the handle that takes places during running. When the free movement of the group of couplers is substantial, there is a possibility that the group of couplers will knock into members that surround the area where the couplers are located, for example, an inner surface of a front cover or the like, and will cause a noise. Further, depending on the force with which the group of couplers knocks into the other object, damage of the couplers may occur.

In order to solve these problems, the couplers that move freely may be fixed to the inside of the front cover. However, simply fixing the couplers is not sufficient, since an approach is required that will not apply excessive tension to the cables and couplers. In addition, a structure that is inexpensive and outstanding in ease of workability must be provided.

SUMMARY OF THE INVENTION

The invention addresses these problems and provides a motorcycle that inhibits free movement of couplers that occurs along with turning of a handle.

A motorcycle of the invention includes: a head pipe that supports a steering shaft that extends downwards from a handle; and a leg shield that covers the head pipe and that is disposed to the front of a seat. A first cable group that includes a brake cable extending from the handle is disposed to a front side of the head pipe inside the leg shield. A second cable group, which does not include the first cable group, includes couplers that connect lead wires extending from the handle. The couplers are disposed to the rear side of the head pipe inside the leg shield.

In one embodiment, the first cable group includes a cable that moves in association with turning of the handle:

In another embodiment, the first cable group further includes a cable for a speedometer.

In another embodiment, a coupler holding bag is provided inside the leg shield for holding the couplers of the second cable group, and the couplers are fixed as a group by the coupler holding bag.

In another embodiment, the coupler holding bag is disposed in the neighborhood of a harness positioning guide that fixes a harness that holds the lead wires in a bundle.

In another embodiment, the head pipe and a main pipe that extends downward to the rear from the head pipe are connected inside the leg shield, and the coupler holding bag is disposed in the vicinity of a connection section of the head pipe and the main pipe.

In another embodiment, a pair of left and right storage pockets for storing objects are formed to a vehicle body rear side of the leg shield, and an accommodating space for accommodating the coupler holding bag is formed in an inner surface of the leg shield between sections where the storage pockets are positioned.

In another embodiment, a leg shield-attachment member for attaching the leg shield is formed in the head pipe, and the coupler holding bag is disposed in the neighborhood of the leg shield-attachment member.

In another embodiment, the motorcycle is a scooter-type motorcycle.

According to the motorcycle of the invention, the first cable group and the second cable group are disposed apart from each other to the front and rear of the head pipe. Accordingly, the brake cable that moves along with turning of the handle is inhibited from knocking into the couplers of the second cable group. As a result, the couplers can be held in a stationary state, whereby the couplers are inhibited from knocking into the inner surface of the leg shield. As a result, noise generated by the couplers knocking into the inner surface and damage to the couplers is inhibited.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are now explained with reference to the drawings. In the drawings, in members and positions having substantially the same function, the same numerals are appended and explained in order to simplify the explanation. The invention is not limited to the following embodiments.

Figure 1:
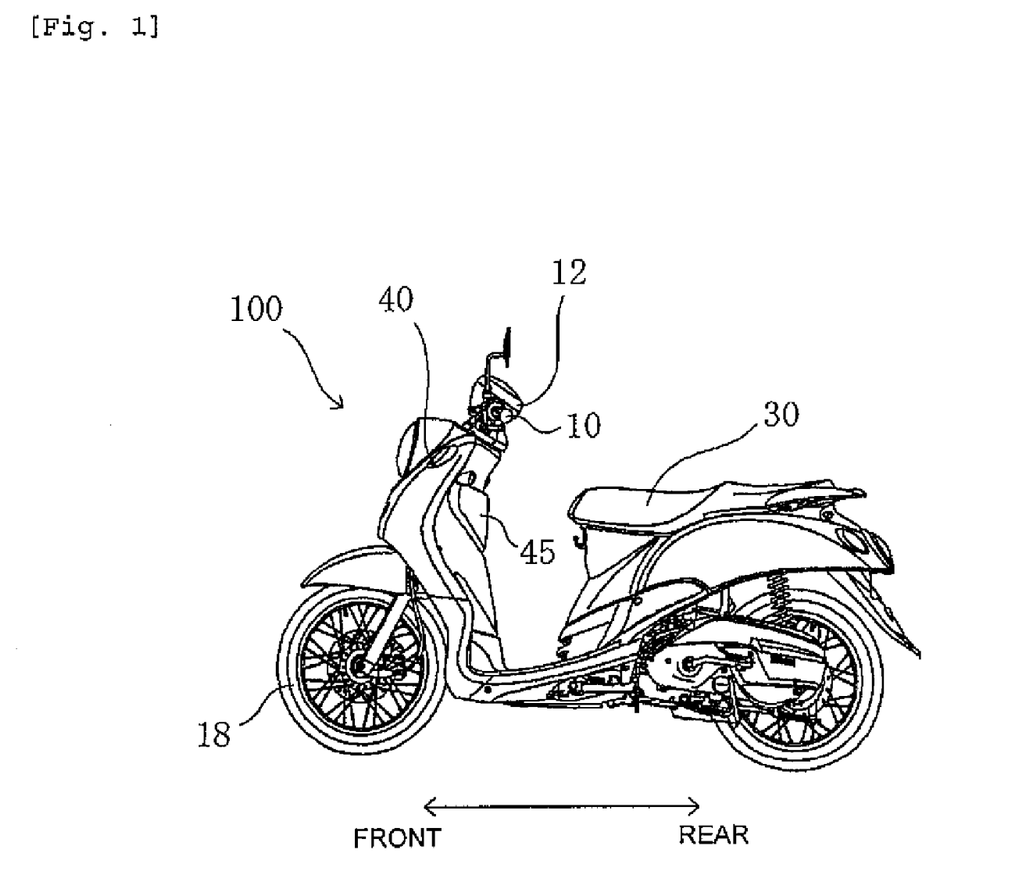
FIG. 1 is a side view of a motorcycle according to an embodiment of the invention.

A motorcycle 100 according to an embodiment of the invention is illustrated in FIG. 1.

Motorcycle 100 includes a seat 30, a handle 10, a leg shield 40 and a front tire 18.

Seat 30 is disposed at a central section in the vehicle body front-rear direction, and handle 10 is provided to the front of seat 30. A handle center member 12 on which a speedometer and the like are mounted is formed in a central section of handle 10 in the vehicle width direction. Front tire 18 is positioned to the front-lower side of handle center member 12 and disposed at the foremost section of the vehicle body.

Leg shield 40 for protecting the rider's legs is provided between front tire 18 and handle center member 12. Leg shield 40 is disposed to the front of seat 30 and is covered by a head pipe 20 (not shown in FIG. 1) that extends forward and downward from handle center member 12.

Figure 2:
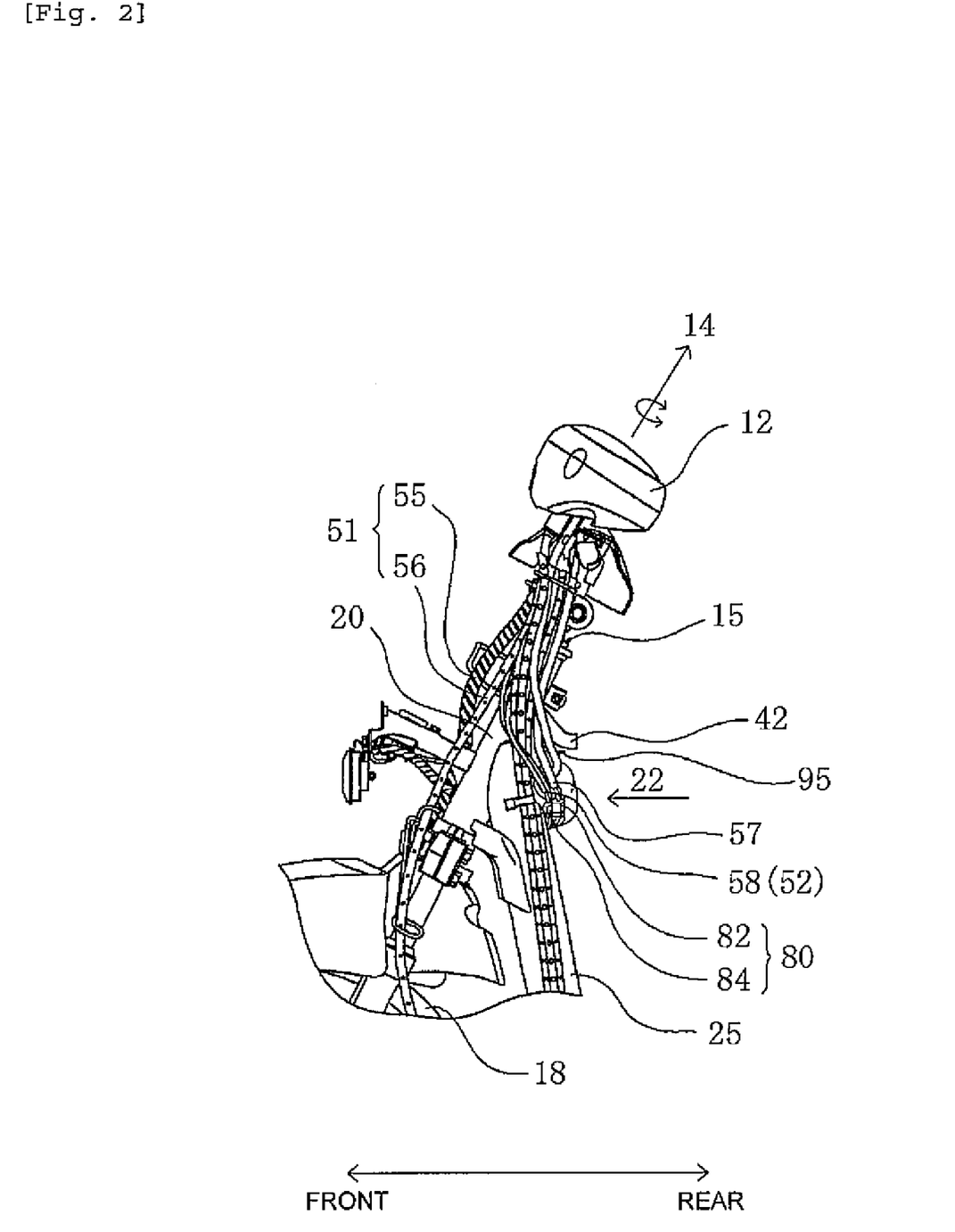
FIG. 2 is a side view of a main section of an internal structure of a leg shield of the motorcycle of FIG. 1.

FIG. 2 illustrates the internal structure of leg shield 40. In order to make the internal structure understandable, FIG. 2 shows a state in which leg shield 40 and handle 10 (with the exception of handle center member 12) are removed.

Handle center member 12 is formed at the central section in the vehicle width direction of handle 10 (not shown). The speedometer and the like are mounted inside handle center member 12.

Front tire 18 is disposed beneath and to the front of handle center member 12, and a steering shaft 15 is provided between front tire 18 and handle center member 12. Steering shaft 15 transmits movement of handle 10 to front tire 18, and is provided on a turning center axis 14 of handle 10.

Head pipe 20 supports steering shaft 15 and is disposed between handle center member 12 and front tire 18. A plurality of cable groups (including a brake cable 55 and lead wires) are arranged along head pipe 20. These cable groups extend in the downward direction from handle 10 and handle center member 12 along head pipe 20, and are finally connected to each member of the vehicle body.

Among the cable groups, a first cable group 51 that includes, at the least, brake cable 55 is disposed to the front of head pipe 20. Brake cable 55 is a brake hose that is used for hydraulic braking. However, brake cable 55 is not so limited and may be, for example, a brake wire that is used in a mechanical brake. Brake cable 55 extends forward and downward from handle 10, passes along the front side of head pipe 20, and extends as far as the right side in the traveling direction of front tire 18. Brake cable 55 extends from brake levers 13 of handle 10. Because brake cable 55 is positioned away from steering shaft 15 located on turning center axis 14 of handle 10, brake cable 55 moves in association with turning of handle 10.

On the other hand, among the plurality of cable groups, a second cable group 52 that does not include first cable group 51 is provided with a group of couplers 80 that connect lead wires. The group of couplers 80 is positioned to the rear of head pipe 20. As an example, a cable 58 that extends downward from handle center member 12 is a lead wire for a speedo assembly, and is provided with a coupler 84 that connects lead wire 58. Coupler 84 is positioned to the rear of head pipe 20. In addition, since lead wire 58 extends from handle center member 12 along steering shaft 15, the extent to which lead wire 58 moves along with turning of handle 10 is less than brake cable 55.

First cable group 51 and second cable group 52 are positioned separately to the front and rear of head pipe 20. Accordingly, brake cable 55 that moves along with turning of handle 10 does not knock into the group of couplers 80 of second cable group 52. As a result, the group of couplers 80 is held in a stationary state and does not knock into the inner surface of leg shield 40. As a result, noise is not generated by the group of couplers 80 knocking into the inner surface, and the group of couplers 80 are not damaged.

In addition, at the design stage, it is only necessary to consider the wiring layout of first cable group 51 and second cable group 52, and since it is not necessary to provide any additional members, for example, a separate member or the like to hold the group of couplers 80, the structure is very simple and inexpensive.

Another possible method for inhibiting free movement of the group of couplers 80 is to directly fix the group of couplers 80 to the inner surface of leg shield 40. However, if the group of couplers 80 is fixed to the inner surface of leg shield 40, torque applied to the cables when handle 10 is turned is applied to the fixed group of couplers 80. Accordingly, excessive tension may be applied to the group of couplers 80 and coupler positional misalignment or damage may occur. In this regard, the present invention inhibits free movement of the group of couplers 80 without fixing the group of couplers 80 to the inner surface of leg shield 40, and without applying excessive tension to the couplers.

The first and second cable groups that extend downward from handle 10 are explained with reference to FIG. 3, which is an expanded front perspective view of a main section of handle 10.

Motorcycle 100 includes handle 10 formed from handle center member 12, a pair of left and right handle grips 11 (11R, 11L), and brake levers 13 (13R, 13L).

Handle center member 12 is formed in the central section of handle 10 in the vehicle width direction. Handle grips 11R, 11L are provided at the outer sides of handle center member 12 in the vehicle width direction. Brake levers 13R, 13L are respectively attached to the front sides of handle grips 11R, 11L.

Brake cable 55 of first cable group 51 of is connected to an end section at the inside in the vehicle width direction of brake lever 13R that is positioned to the front side of handle grip 11R. Because an end section of brake cable 55 turns along with turning 16 of handle 10 in the direction of arrow 17, brake cable 55 connected thereto moves as well. In other words, brake cable 55 moves along with turning 16 of handle 10.

First cable group 51 includes, at the least, brake cable 55. However, first cable group 51 may include other cables that move along with turning of handle 10.

For example, a cable 59 that extends downwards from handle grip 11R is a throttle wire that transmits operation of the throttle to a fuel supply device (a carburetor or the like). Throttle wire 59 is connected to a throttle grip formed on handle grips 11R, whereby throttle wire 59 moves in association with turning of handle 10. A cable group like this that moves in association with turning of handle 10 can be positioned to the front side of head pipe 20.

Cables that do not move in association with turning of handle 10 can also be included in first cable group 51.

For example, a cable 56 that is used for the speedometer may be included in first cable group 51. Cable 56 is connected to the speedometer mounted inside handle center member 12, and functions to transmit rotational speed of front tire 18 to the speedometer. Because cable 56 extends downwards along steering shaft 15 from handle center member 12, the extent to which cable 56 moves along with turning of handle 10 is smaller as compared to brake cable 55 or throttle wire 59.

In this embodiment, first cable group 51 is disposed to the front side of head pipe 20. However, the term "front side" as used here indicates that first cable group 51 is disposed to the vehicle body front side when the group of couplers 80 disposed to the rear side of head pipe 20 is taken as a point of reference. Thus, so long as first cable group 51 and the group of couplers 80 do not knock into each other when handle 10 is turned, first cable group 51 may be positioned at a location that is to the front side of the group of couplers 80 (for example, to the side of head pipe 20).

If the relative positional relationship of first cable group 51 and the group of couplers 80 is one in which the members are to the front and rear of head pipe 20, first cable group 51 and the group of couplers 80 do not knock into each other. Accordingly, first cable group 51 may be disposed in a bundle or apart. Furthermore, the group of couplers 80 may be disposed in a cluster or apart.

On the other hand, one end of lead wire 58 that is included in second cable group 52 is connected to the speedometer mounted inside handle center member 12, and the other end of lead wire 58 extends downward along head pipe 20. A coupler 84 is connected to lead wire 58 (FIG. 2). Because lead wire 58 extends along steering shaft 15 from handle center member 12, the extent to which lead wire 58 moves along with turning of handle 10 is small as compared to brake cable 55.

Figure 3:
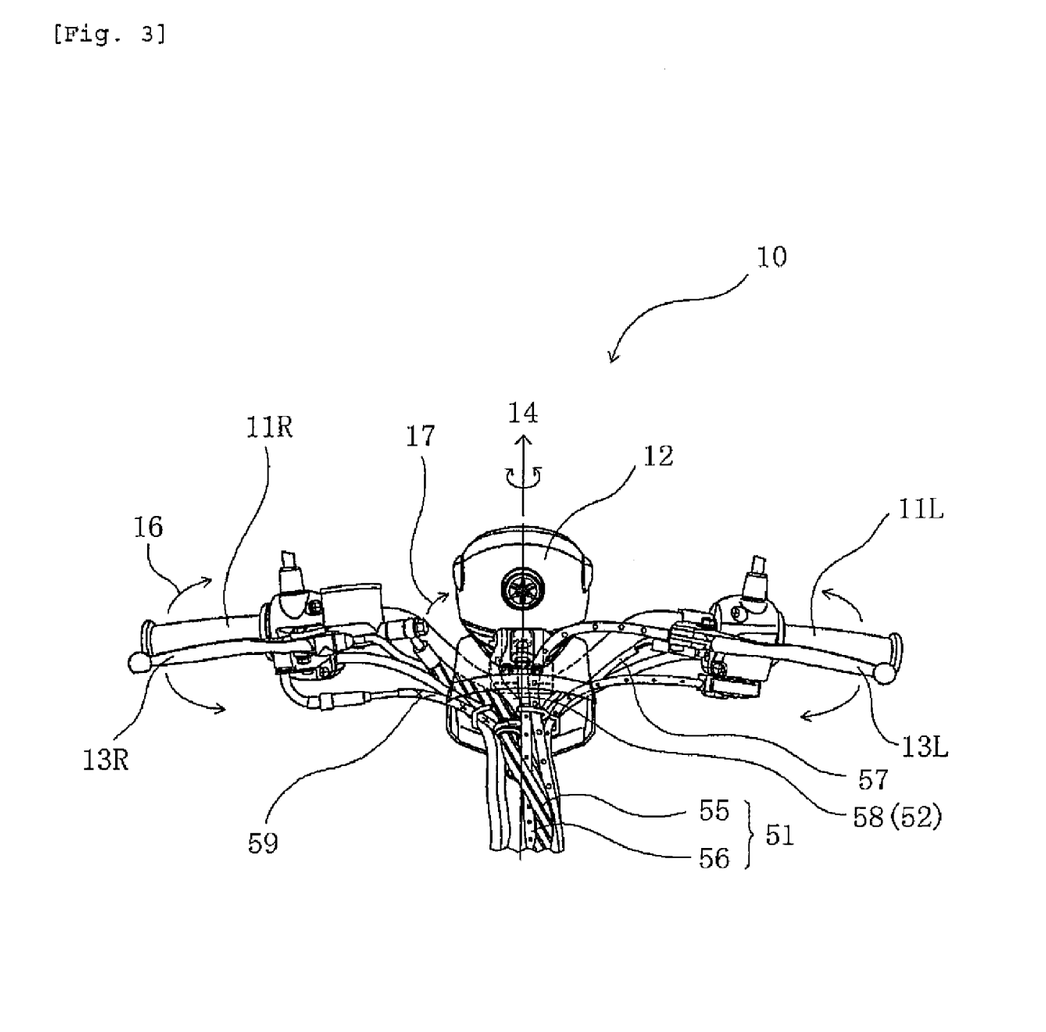
FIG. 3 is an expanded front perspective view of a main section of a handle of the motorcycle of FIG. 1.

In the example shown in FIG. 2 and FIG. 3, brake cable 55 and cable 56 are disposed to the front side of head pipe 20, and throttle wire 59 is disposed to the side of head pipe 20 that is disposed to the front side of coupler 84. Coupler 84 of lead wire 58 is disposed to the rear side of head pipe 20.

As a result, when the handle is turned, brake cable 55 does not knock into coupler 84, and coupler 84 is held in a stationary state. Accordingly, coupler 84 does not knock into the inner surface of leg shield 40.

In addition, because cables that move in association with turning of handle 10 (in this example, throttle wire 59) are included in first cable group 51 in addition to brake cable 55, the separation of cables that move in association with turning of handle 10 and the group of couplers 80 is even more distinct. This separation inhibits free movement of the couplers even more effectively.

In addition, as described above, cable 56 that is included in first cable group 51 moves along with turning of handle 10 to a comparatively smaller extent. Furthermore, as a result of disposing cable 56 to the front side of head pipe 20, cable 56 can connect the speedometer mounted in handle center member 12 and front tire 18 with the shortest possible distance, which has the advantage that the length of cable 56 used for the speedometer can be reduced.

FIGS. 4(a)-(c) are expanded views of the main section of the internal structure of leg shield 40 when viewed from behind head pipe 20 (the direction of arrow 22).

A tubular coupler holding bag 90 is attached to the rear side of head pipe 20. Coupler holding bag 90 holds the group of couplers 80 of second cable group 52 disposed to the rear side of head pipe 20.

As a result, the separately disposed group of couplers 80 is fixed as a group in one location, thereby more reliably inhibiting free movement of the couplers. In addition, coupler holding bag 90 protects the group of couplers 80 from mud, stones, or the like, that are thrown up by front tire 18.

As a result of fixing the group of couplers 80 in coupler holding bag 90, second cable group 52 can include not only cables that move to a small extent along with turning of handle 10 but also cables that move to a larger extent along with turning of handle 10. For example, a coupler 82 held in coupler holding bag 90 may be a coupler that connects a lead wire 57 of a handle switch, and one end of lead wire 57 may be connected to an end section of handle grip 11L (refer to FIG. 3). Accordingly, lead wire 57 having the coupler 82 moves in association with turning 16 of handle 10. However, if coupler holding bag 90 fixes coupler 82 along with the group of couplers 80, even if lead wire 57 moves a little, lead wire 57 and the group of couplers 80 do not knock into each other. As a result, free movement of the group of couplers 80 is inhibited.

Coupler holding bag 90 has a tubular shape that is formed by folding a strip-shaped elastic member in two. A hanging hole 91 and a hole 92 are formed in this strip-shaped elastic member. A hook shaped hanging hook 95 is provided in a back surface of head pipe 20. Hanging hook 95 is inserted, in order, through hole 91 and then hole 92 of coupler holding bag 90, thereby attaching and hanging coupler holding bag 90 from head pipe 20. A coupler holding operation that is used to hold the couplers inside coupler holding bag 90 is now explained.

First, as can be seen from FIG. 4(a) hook 95 is inserted into hole 91 of coupler holding bag 90, and then coupler holding bag 90 is hung from head pipe 20. Hook 95 is not passed through hole 92, and tubular coupler holding bag 90 is half opened such that the inside of coupler holding bag 90 is exposed.

Next, as shown in FIG. 4(b), the coupler connection operation is performed inside coupler holding bag 90 which has its inside exposed.

Finally, as shown in FIG. 4(c), hook 95 is inserted through hole 92 that hook 95 has not yet been inserted through, whereby the coupler holding operation is completed.

In this assembly process, coupler holding bag 90 is not repeatedly moved when performing each connection operation, and direct connection is performed inside coupler holding bag 90. Accordingly, efficiency is improved substantially.

In the above example, a strip-shaped elastic material is used for the material and the shape of coupler holding bag 90. However, so long as a material and a shape that allow the couplers to be fixed are used, the material and the shape of coupler holding bag 90 is not limited to a strip-shaped elastic material. For example, the coupler holding bag may have a cylindrical cup-like shape.

Next, the position of coupler holding bag 90 on the inside of leg shield 40 is explained with reference to FIG. 4(b).

A hose-like harness 75 that bundles the cables together is provided to the rear side of head pipe 20. Harness 75 extends downwards along a main pipe 25. In order to stop harness 75 from separating from main pipe 25, harness 75 is held inside of a circular arc shaped harness positioning guide 78, and fixed to main pipe 25. Harness positioning guide 78 functions both to fix harness 75 to main pipe 25, and to firmly connect the cables that pass through harness 75 together so that the cables cannot freely move.

After the group of couplers 80 is held by coupler holding bag 90, second cable group 52 is inserted through harness 75 to form a single bundle, and is fixed by harness positioning guide 78 such that it cannot freely move. Coupler holding bag 90 is disposed in the neighborhood of harness positioning guide 78.

In this structure, the group of couplers 80 is fixed close to harness positioning guide 78 that functions to fix second cable group 52. As a result, variation in the length dimension of the cable from harness positioning guide 78 to the group of couplers 80 is inhibited. A situation is thereby avoided in which, when the holding operation is performed in which the group of couplers 80 is held by holding bag 90, the group of couplers 80 cannot be held as a group inside holding bag 90 as a result of irregularity in the dimension of the cables.

In addition, harness 75 is fixed by being held inside positioning guide 78. Accordingly, there is a possibility that oscillation centering on positioning guide 78 in the direction of arrows 72 will occur as a result of vibrations that occur during running. However, in the above structure, holding bag 90 can be disposed close to the center point of the oscillation, and thus even if harness 75 oscillates, the torque applied to the group of couplers 80 inside the coupler holding bag 90 is small. As a result, the group of couplers 80 is reliably maintained in a held state. In addition, it is possible to reduce the weight of harness 75 to the fore of positioning guide 78 that is applied to the group of couplers 80.

In this embodiment, the phrase "the neighborhood" of harness positioning guide 78 indicates a distance that is sufficient to make the length dimension of the cable from harness positioning guide 78 to the group of couplers 80 regular. If the distance is sufficient to make the length dimension of the cables regular, when the holding operation in which the group of couplers 80 is held inside coupler holding bag 90 is performed, the group of couplers 80 is held reliably. Alternatively, the phrase "the neighborhood" of harness positioning guide 78 indicates a distance that is sufficient to inhibit torque applied to the group of couplers 80 to a small amount even if harness 75 oscillates. If the distance is sufficient to inhibit the torque applied to the group of couplers 80 to a small amount when harness 75 oscillates, the group of couplers 80 is inhibited from protruding out from coupler holding bag 90. As an example of the distance between coupler holding bag 90 and harness positioning guide 78, it is possible to set the smallest possible distance that is sufficient to ensure that no restriction is caused when performing the holding operation in which the group of couplers 80 is held inside coupler holding bag 90.

Figure 5:
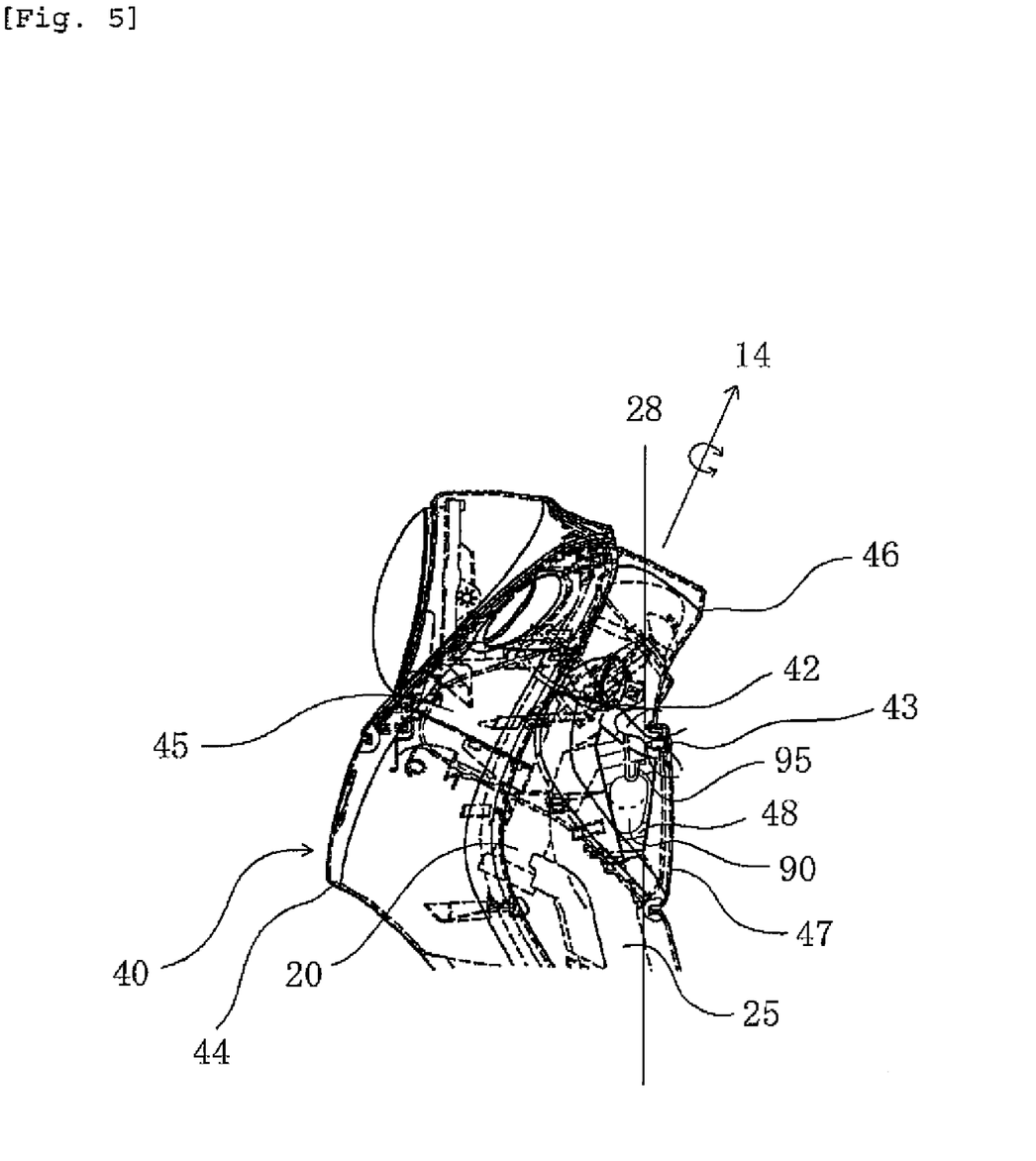
FIG. 5 is a perspective view of the inside of the leg shield when viewed from a left side surface in the traveling direction.

Next, the position at which coupler holding bag 90 is disposed inside leg shield 40 is explained with reference to FIG. 5. FIG. 5 is a perspective view of the inside of leg shield 40 when viewed from a left side surface in the traveling direction. Wiring cable groups 51 and 52 are omitted from the FIG. 5.

Leg shield 40 is formed by combining a front surface panel 44 formed at the front side of the vehicle body, and a back panel 46 formed at the rear side of the vehicle body. Head pipe 20 is disposed at the inside of leg shield 40 and extends from the upper rear side to the lower front side. Main pipe 25 inclines downwards to the rear side from a lower section of head pipe 20. Coupler holding bag 90 is accommodated in a dead space 48 formed in the vicinity of a connection section of head pipe 20 and main pipe 25.

As a result of accommodating coupler holding bag 90 in dead space 48, wasted space in the vehicle body structure is eliminated, and the limited available space is used effectively. In addition, in this structure, head pipe 20 is disposed on turning center axis 14 of handle 10, and second cable group 52 is attached in a wound manner to the rear side of head pipe 20 (FIG. 2). Accordingly, torque is not applied to second cable group 52 as a result of turning of handle 10. Therefore, even if handle 10 is turned, second cable group 52 is maintained in an immobile state, which contributes to inhibiting free movement of the group of couplers 80.

In this embodiment, coupler holding bag 90 is disposed in the vicinity of the connection section of head pipe 20 and main pipe 25. However, coupler holding bag 90 may be disposed in an area that extends from the rear side of the connection section of head pipe 20 and main pipe 25 to the front side of a vertical plane 28 of a section of head pipe 20 that is located to the rearmost end of the vehicle body. If coupler holding bag 90 is disposed in this manner, dead space 48 that is beneath head pipe 20 can accommodate coupler holding bag 90.

FIG. 6(a) shows back panel 46 of leg shield 40 in the region that covers the periphery of coupler holding bag 90, and FIG. 6(b) is a front view of the inside of back panel 46.

A pair of left and right storage pockets 45 is provided to the outer sides in the vehicle width direction of back panel 46. Pockets 45 protrude to the front of the vehicle body and provide a large luggage storage space. Coupler holding bag 90 is disposed to the inside in the vehicle width direction from storage pockets 45 that protrude to the front of the vehicle body, and is interposed between pockets 45. As a result, coupler holding bag 90 is inhibited from oscillating to the left and right as a result of vibration that occurs during running.

The section 47 between pockets 45 protrudes to the rear of the vehicle body. As a result, dead space 48 formed in the neighborhood of the connection section of head pipe 20 and main pipe 25 expands to the rear of the vehicle body, and the space for accommodating coupler holding bag 90 is reliably provided.

In the above-described structure, coupler holding bag 90 is fitted snugly in the accommodating space (dead space 48), thereby eliminating any empty space in which coupler holding bag 90 could move as result of vibration that occurs during running. Accordingly, coupler holding bag 90 is securely fixed and free movement of the couplers held by coupler holding bag 90 and knocking of the couplers into other objects is inhibited.

Figure 4:
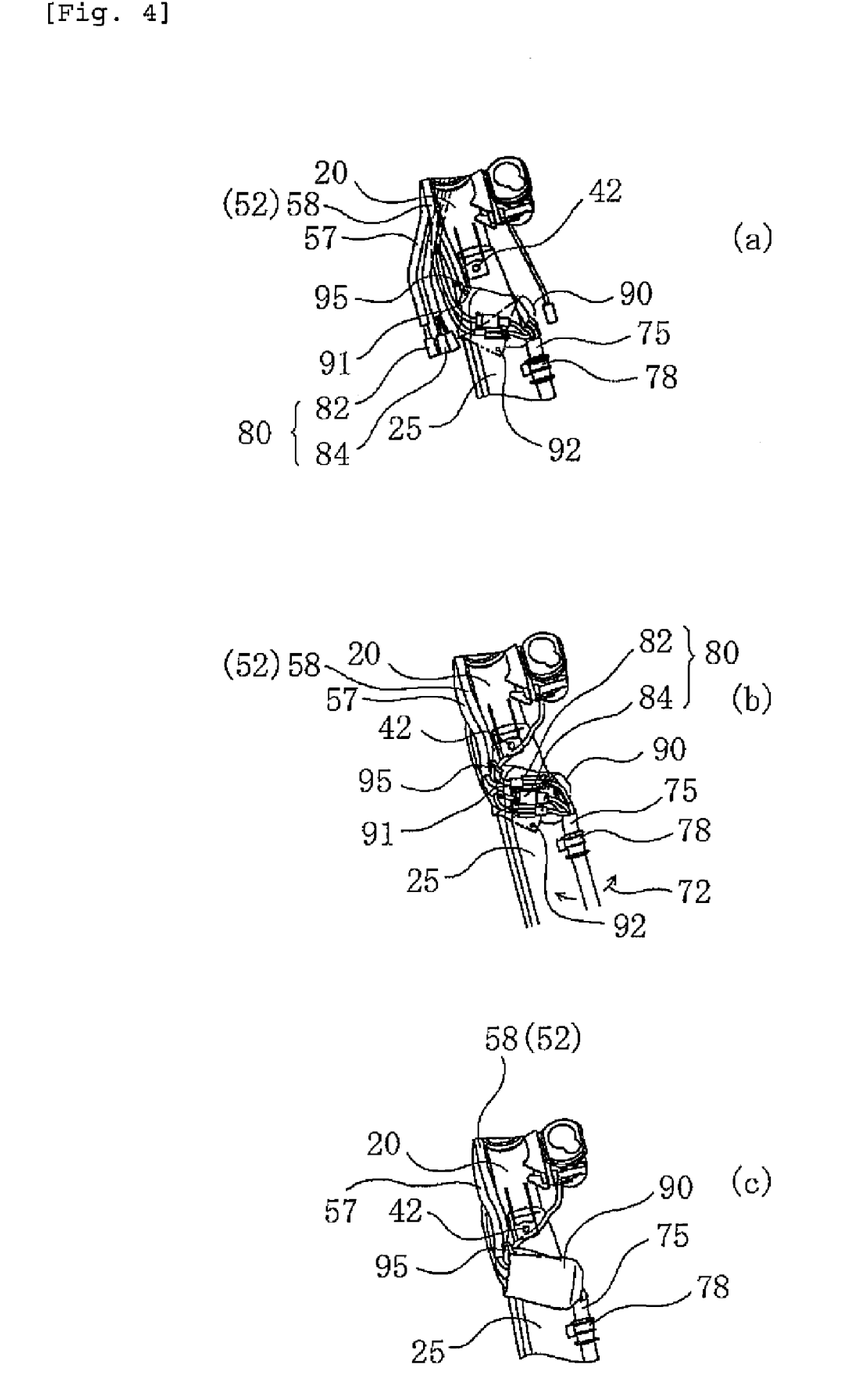
FIG. 4(a)-(c) are expanded views of the main section of the internal structure of the leg shield when viewed from behind a head pipe.
Figure 6:
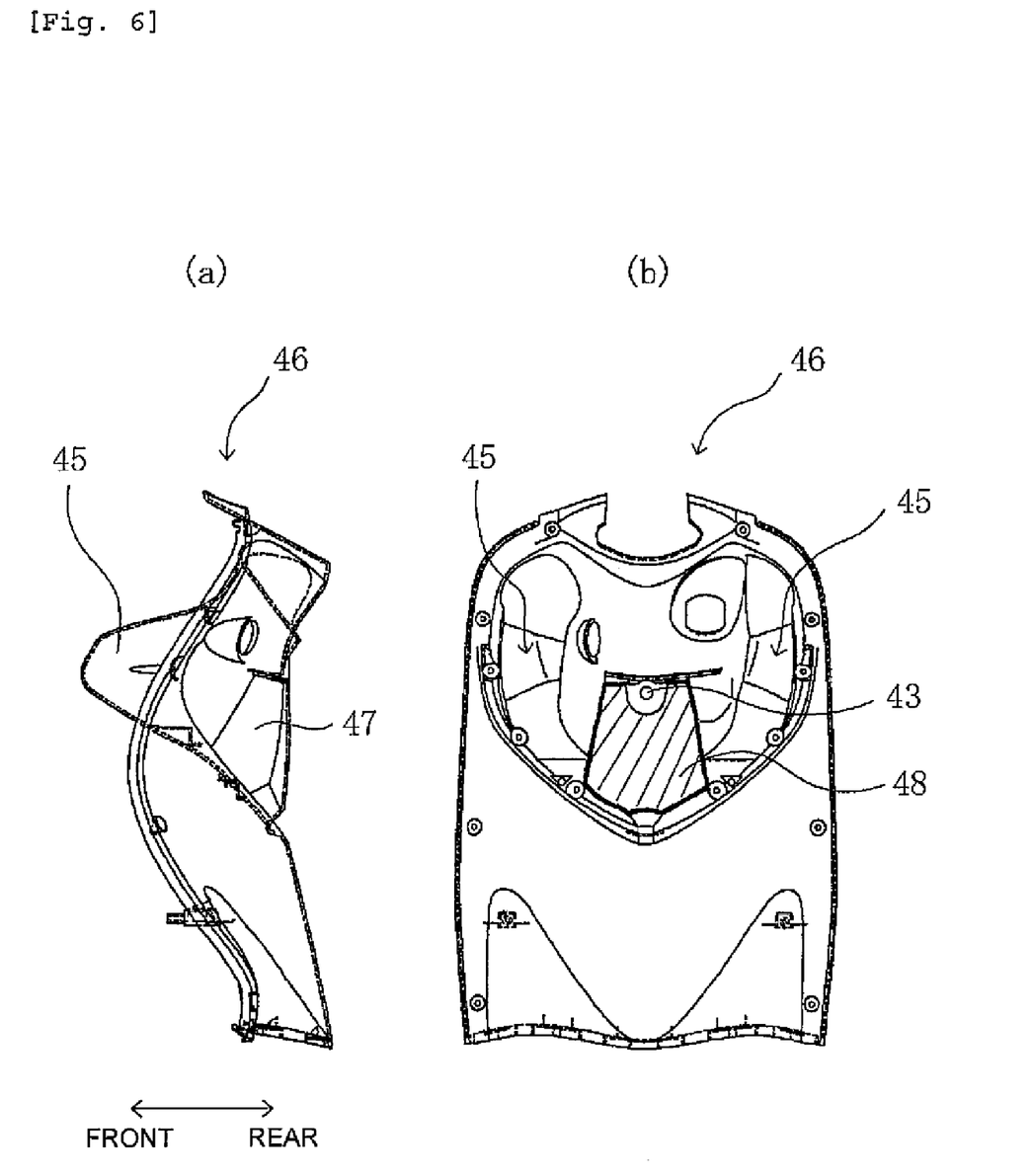
FIG. 6(a) is a side view of a back panel of the leg shield.
FIG. 6(b) is a front view of the inside of the back panel.

Coupler holding bag 90 is disposed in the vicinity of an attachment member 42 for attaching the leg shield that is formed in head pipe 20. More specifically, as seen in FIGS. 4-6, a protrusion 43 is formed in the vicinity of the center of back panel 46, and, on the other side, attachment member 42 protrudes from head pipe 20. Protrusion 43 is fitted to attachment member 42, whereby back panel 46 is attached to head pipe 20. Hanging hook 95 is formed below attachment member 42, and hook 95 is used to hang holding bag 90 from head pipe 20. As a result, holding bag 90 is disposed in the neighborhood of attachment member 42. Back panel 46 is made of a resin material. Accordingly, a design is required that can handle distortion or deformation that may occur during molding. By disposing holding bag 90 in the neighborhood of attachment member 42, accommodation space is reliably provided even when distortion occurs during molding.

In this embodiment, coupler holding bag 90 is disposed in the neighborhood of attachment member 42. The term "in the neighborhood" indicates a short distance that, even if distortion occurs during molding, the accommodation space of coupler holding bag 90 is reliably provided. For example, a distance of 15 cm or less between coupler holding bag 90 and attachment member 42 may be set.

This embodiment has been described with reference to a scooter type motorcycle. However, the "motorcycle" of the invention includes mopeds (motor bikes) and other vehicles turned by a handle. The term "motorcycle" also includes any vehicle that has two or more wheels for at least the front wheel or the rear wheel, and that is, in terms of the total number of tires, a three wheel vehicle, a four wheel vehicle (or more).

The invention provides a motorcycle that inhibits free movement of couplers along with turning of a handle, and promotes durability of cables and the couplers.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a handle;
   a steering shaft that extends downward from the handle;
   a head pipe that supports the steering shaft;
   a seat;
   a leg shield that covers the head pipe and that is disposed to a front of the seat;
   a first cable group comprising a brake cable that extends from the handle disposed to a front side of the head pipe inside the leg shield; and
   a second cable group, which does not include the first cable group, comprising couplers that connect lead wires extending from the handle, the couplers of the second cable group being disposed to a rear side of the head pipe inside the leg shield.

2. The motorcycle according to claim 1, wherein the first cable group includes a cable that moves in association with turning of the handle.

3. The motorcycle according to claim 1, wherein the first cable group further comprises a cable for a speedometer.

4. The motorcycle according to claim 1, further comprising:
   a coupler holding bag provided inside the leg shield for holding the couplers of the second cable group and fixing the couplers as a group.

5. The motorcycle according to claim 4, further comprising:
   a harness that holds the lead wires in a bundle; and
   a harness positioning guide that fixes the harness, wherein the coupler holding bag is disposed in the neighborhood of the harness positioning guide.

6. The motorcycle according to claim 4, further comprising:
   a main pipe that extends downward to the rear from the head pipe, wherein the head pipe and the main pipe are connected inside the leg shield, and
   the coupler holding bag is disposed in the vicinity of a connection section of the head pipe and the main pipe.

7. The motorcycle according to claim 4, further comprising:
   a pair of left and right storage pockets for storing objects formed to a vehicle body rear side of the leg shield, and
   an accommodating space for accommodating the coupler holding bag formed in an inner surface of the leg shield between sections where the pair of left and right storage pockets are positioned.

8. The motorcycle according to claim 4, wherein
   a leg shield-attachment member for attaching the leg shield is formed in the head pipe, and
   the coupler holding bag is disposed in the neighborhood of the leg shield-attachment member.

9. The motorcycle according to claim 1, wherein the motorcycle is a scooter-type motorcycle.

10. The motorcycle according to claim 4, wherein the coupler holding bag has a tubular shape that is formed by folding a strip-shaped elastic member in two.

11. The motorcycle according to claim 4, wherein a hanging hole and a second hole are formed in the coupler holding bag.

12. The motorcycle of claim 11, wherein a hook shaped hanging hook is provided in a back surface of the head pipe.

13. The motorcycle of claim 12, wherein the hanging hook is inserted through the hanging hole and the second hole of the coupler holding bag, thereby attaching and hanging the coupler holding bag from the head pipe.

* * * * *